Dec. 27, 1966   F. J. CARSON ET AL   3,294,516
APPARATUS FOR PRESS BENDING GLASS SHEETS
Filed Sept. 2, 1964   3 Sheets-Sheet 1

INVENTORS
Frank J. Carson and
Herbert A. Leflet, Jr.
BY
Nobbe & Swope
ATTORNEYS

Dec. 27, 1966  F. J. CARSON ET AL  3,294,516
APPARATUS FOR PRESS BENDING GLASS SHEETS
Filed Sept. 2, 1964  3 Sheets-Sheet 2

INVENTORS
Frank J. Carson and
BY Herbert A. Leflet, Jr.

Nobbe & Swope
ATTORNEYS

Dec. 27, 1966   F. J. CARSON ET AL   3,294,516
APPARATUS FOR PRESS BENDING GLASS SHEETS
Filed Sept. 2, 1964   3 Sheets-Sheet 3

INVENTORS
Frank J. Carson and
BY Herbert A. Leflet, Jr.
Nobbe & Swope
ATTORNEYS

United States Patent Office 3,294,516
Patented Dec. 27, 1966

3,294,516
APPARATUS FOR PRESS BENDING
GLASS SHEETS
Frank J. Carson and Herbert A. Leflet, Jr., Toledo, Ohio, assignors to Libbey-Owens-Ford Glass Company, Toledo, Ohio, a corporation of Ohio
Filed Sept. 2, 1964, Ser. No. 395,360
3 Claims. (Cl. 65—273)

This application is a continuation-in-part of application Serial No. 262,449, filed March 4, 1963, now abandoned.

The present invention relates generally to the bending of sheets or plates of glass and, more particularly, to an improved method and apparatus for bending glass sheets to precisely defined curvatures.

Curved glass sheets of the type with which the present invention is particularly concerned are rather commonly utilized as glazing closures in vehicles or the like. When used for this purpose, the glass sheets are cut and bent to within close tolerances of a preselected outline and curvature dictated by the size of the opening to be glazed and by the over-all design of the vehicle on which they are intended to be used. Usually after being bent, the curved sheets are heat treated either by being annealed to remove internal stresses present in the glass sheets or by being tempered to increase the strength of the sheets and to modify the breaking characteristics of the glass.

Usually, the commercial production of curved glass sheets is accomplished by employing one or the other of two rather conventional basic procedures. In the first procedure, commonly known as press bending, the glass sheets are heated to the softening point of glass and thereafter pressed between complemental molding faces formed on nesting molds. One very perceptible drawback of the press bending procedure is that the major surfaces of the glass sheets are contacted and subjected to pressure by the molding faces on the mold parts while the sheets are in a heated, softened condition rendering it difficult to maintain the original smoothness of these surfaces. It will be apparent that any marring or distortion of the major portions of glass sheets intended for use as vehicle windows or the like is detrimental and if this marring or distortion is severe enough, it may render the sheets entirely unfit for their intended purpose.

The other basic procedure by which glass sheets are bent comprises supporting a flat sheet of glass on a mold having shaping surfaces conforming to the desired curvature of the sheet when bent and, while thus supported, subjecting the sheet to a heated atmosphere to raise its temperature to the softening point of glass thereby permitting the sheet to sag under the influence of gravity against the shaping surfaces of the mold. With this so-called "gravity bending" procedure the major viewing areas of the heat softened sheets are not subjected to pressures tending to mar or distort the glass surfaces. Furthermore, by utilizing a skeleton or peripheral mold having a shaping surface which engages only the marginal portions of the glass sheet, contact between the viewing areas of the sheet and the mold may be completely eliminated.

In bending glass sheets by the gravity bending procedure, it will be apparent that the amount of sagging of the glass sheet, and thus the curvature which the sheet assumes, is dependent upon the temperature to which it is heated and upon the period of time the glass is maintained at this temperature. In production, to insure that each of a number of glass sheets will be consistently bent to the same curvature and that this curvature will be within the tolerances prescribed, requires very close control over the heating of the sheets. Difficulty in maintaining this close control is ofttimes encountered and any deviation from optimum conditions may result in some rejects in a production run.

A primary aim of the present invention is to provide an improved method of and apparatus for bending glass sheets of the above character accurately to precisely defined curvatures while maintaining the major areas of the sheets substantially free from mars or distortions.

Another object of the invention is to initially bend the glass sheets by gravity on an outline type bending mold and thereafter press the glass into close engagement with the shaping surfaces formed on the bending mold.

Other objects and advantages of the invention will become more apparent during the course of the following description when taken in connection with the accompanying drawings.

In the drawings, wherein like numerals are employed to designate like parts throughout the same:

Figure 1:
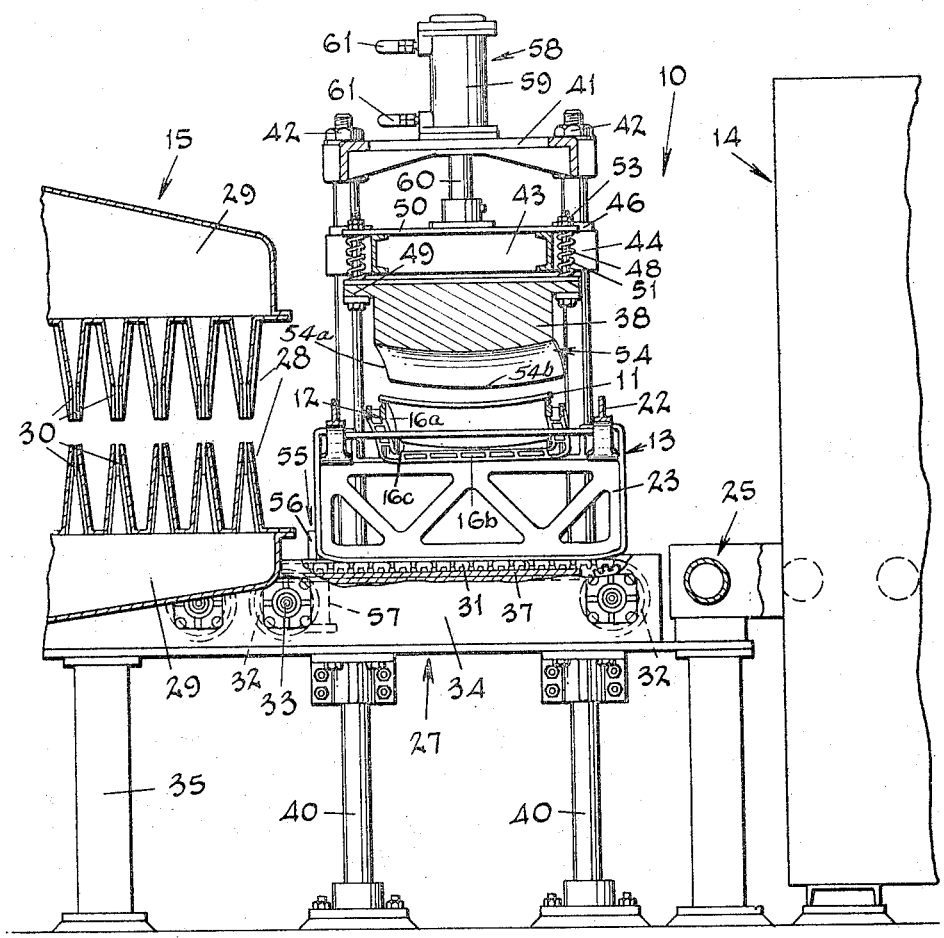
FIG. 1 is a side elevational view of a bending and tempering apparatus incorporating the novel features of the present invention.

For purposes of illustration, the present invention is shown in the drawings in connection with apparatus 10 adapted for use in the commercial production of curved glass sheets by conventional present-day practices. Generally stated, in accordance with these bending practices, a glass sheet 11 to be bent is supported on a mold 12 carried by a rack 13 and, while thus supported, is passed through a furnace 14 to heat the sheet to the softening point of glass whereupon it sags downwardly onto a curved shaping surface formed on the mold. After being bent and while still supported on the mold, the sheet is moved through a cooling device 15 operable to reduce the temperature of the glass in a controlled manner.

Usually, in commercial operations, a number of substantially duplicate bending molds are utilized and these molds are moved through the furnace and the cooling device successively to bend and heat treat a series of glass sheets in a continuous manner.

Figure 2:
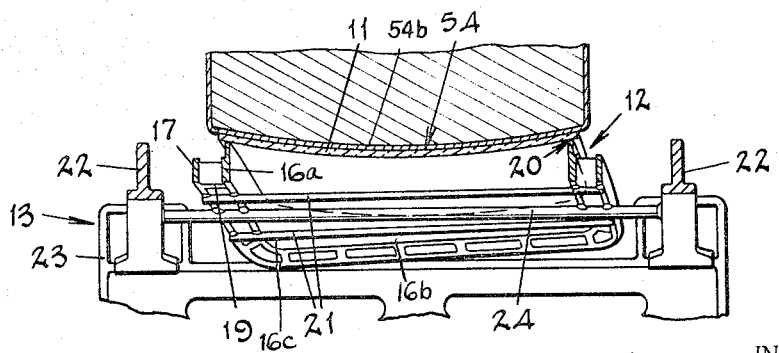
FIG. 2 is a fragmentary sectional view of the bending apparatus showing the glass sheet being pressed into engagement with the shaping surface of the mold.
Figure 4:
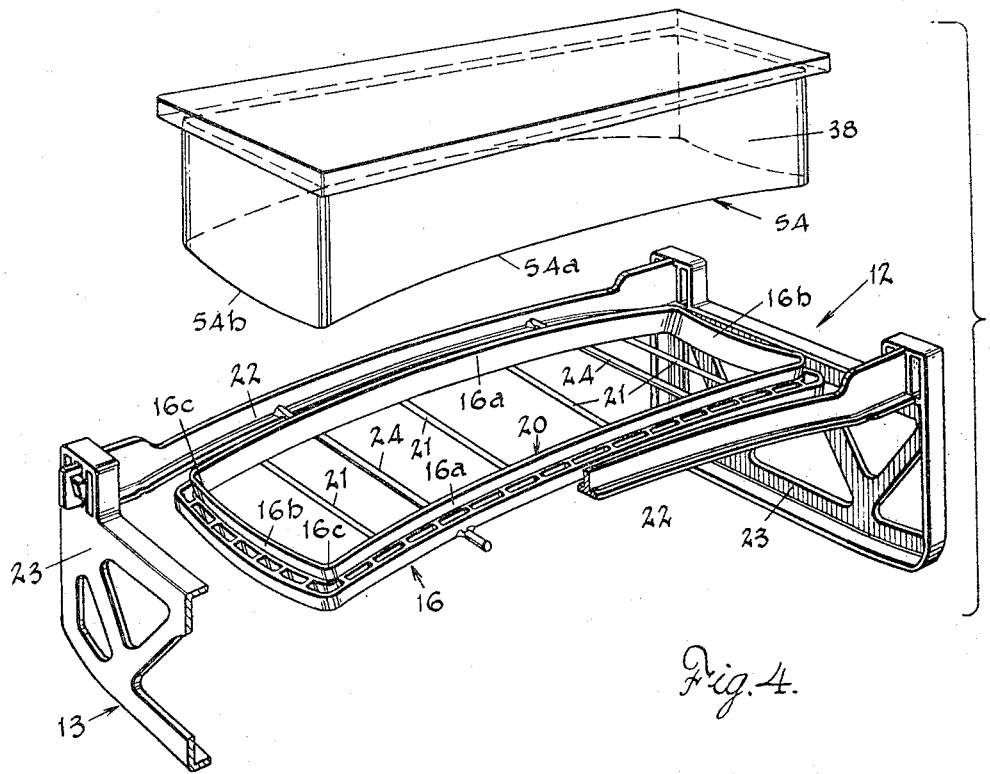
FIG. 4 is a fragmentary perspective view of the bending apparatus showing the pressing member and shaping rail of the mold.

The illustrated mold 12 is of the skeleton or outline type and includes a continuous shaping rail 16 comprised of a pair of longitudinally extending side members 16a and a pair of transversely extending end members 16b interconnected by curved corner portions 16c to form a closed ring. As best shown in FIGS. 2 and 4, the shaping rail 16 of the mold may be in the form of a casting surrounded by a bracing rail 17 joined to the shaping rail by transversely extending webs 19 interposed between said shaping rail and bracing rail to add rigidity to the mold. Formed on the upwardly directed face of the shaping rail is a shaping surface 20 conforming in outline and elevation to the desired outline and curvature of the bent glass sheet to receive the sheet as it sags onto the mold. Struts or bridging members 21, comprising rods extending transversely across the mold with their opposite ends fixed to the bracing and shaping rails, brace the rails to provide a rigid, unitary structure.

In the illustrated mold, the shaping rail 16 defines a substantially rectangular outline and the shaping surface portions of the side members 16a are formed with convex curvature as viewed in elevation while the shaping surface portions of the transversely extending end members are formed with concave curvatures as viewed in elevation so as to create an anticlastic curvature in a glass sheet bent into conformity therewith. It will be appreciated, however, that the outline configuration of the shaping rail and the curvature of the shaping surface depends solely on the size, shape and curavture of the bent glass sheet. Moreover, the construction of the mold is, to some extent, dictated by the particular curvature to be imparted to the glass sheet. Thus in producing shallow bends, as in the present instance, a so-called "solid ring" mold of the type illustrated herein is commonly utilized while for more complex bends a so-called "hinged" mold having the shaping rail divided into a number of articulated sections relatively movable between open and closed positions is employed.

The rack 13 on which the mold is carried comprises a pair of side rails 22 and a pair of end sections 23 arranged to form an open, generally rectangular frame within the confines of which the mold is mounted. The side rails 22 of the rack 13, which are curved to conform generally to the curvature of the shaping rail 16, extend along the opposite sides of the mold with their opposite ends attached to the upper corners of the vertically disposed, rectangularly shaped end sections 23. The mold is bodily carried by the rack through the medium of transversely disposed rods 24 underlying and secured to the side members 16a of the shaping rail 16 and the bracing rail 17 and fixed at their opposite ends to the side rails 22 of the rack.

In operation, after the flat glass sheet 11 is positioned on the mold 12, the latter is carried by the rack 13 through the furnace 14 on a roller conveyor 25 extending therethrough whereupon the sheets soften and sag toward the shaping surface 20 of the mold. In order to utilize the heat imparted to the sheet during bending to heat treat the glass, usually, upon leaving the exit end of the furnace, the bent glass sheets are carried by the mold into and through the cooling device 15 which reduces the temperature of the sheet in a controlled manner. In this connection, an additional conveyor 27 extending outwardly from the exit end of the furnace and through the cooling device 15 is provided to define a continuous substantially straight path along which the molds are carried.

Figure 3:
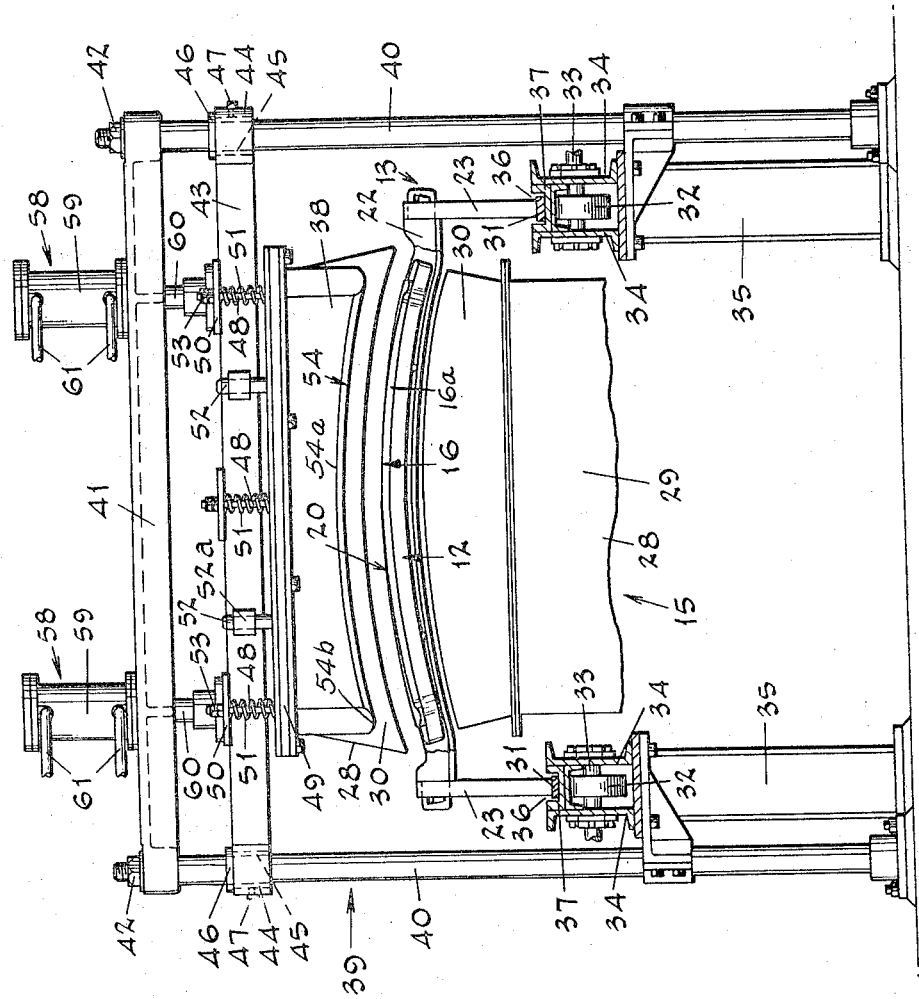
FIG. 3 is an end elevational view of the bending apparatus.

The exemplary apparatus is particularly adapted for the production of bent, tempered glass sheets and, therefore, upon leaving the exit end of the furnace 14 and after the sheets 11 are bent and resting on the shaping surface 20 of the mold 12, they are subjected to a chilling atmosphere to rapidly cool them from the elevated bending temperature to a temperature below the annealing range of glass. To this end, the sheets are passed between opposed blast heads 28 operable to direct streams of relatively cool air against their opposite surfaces. As shown in FIGS. 1 and 3, the blast heads 28 include plenum chambers 29 disposed above and below the path of movement of the molds 12 and elongated transversely disposed apertured fins 30 curved to complement the curvature of the mold and the glass sheets resting thereon and projecting inwardly toward the mold from each of the plenum chambers, which fins direct the cooling air under pressure from the chambers 29 against the upper and lower surfaces of the sheet; the inner ends of the opposed fins being spaced apart sufficiently to permit the passage of the mold therebetween.

Herein, the conveyor 27 includes two parallel endless chains 31 extending longitudinally along the path and adapted to receive the end sections 23 of the rack. The chains are each entrained around sprockets 32 fast to shafts 33 journaled on channel members 34 supported on pedestals 35 spaced apart along the path. In order to insure proper alignment of the mold and the blast heads, each of the chains 31 rides in the bottom of an upwardly opening groove 36 so that the end sections of the rack resting thereon are guided by the side walls of the groove. As best shown in FIG. 1, in the present instance, the groove is provided by a channel member 37 extending along the path and secured to the channels 34.

As brought out above, whether or not the glass sheet assumes the desired curvature depends upon whether or not the sheet sags into contact with the shaping surfaces around the entire marginal edges of the sheet. This, in turn, depends upon the temperature of the heated atmosphere in the furnace and the amount of time the sheet is exposed to this heated atmosphere. In other words, the sheet must be heated to a temperature at which the glass softens and loses its rigidity permitting it to sag against the shaping surface 20. Since the shaping surface contacts only the marginal edge portions of the sheet, the amount of curvature in those portions of the sheet intermediate the marginal edges is dependent upon how much the sheet continues to sag after the marginal edges are in engagement with the shaping surfaces.

As pointed out above, since the sheets must be bent to within relatively close tolerances of a preselected curvature, the temperature to which the sheets are heated becomes critical. If the sheets are not heated to a sufficiently high temperature, they will not sag into registry with the shaping surface of the mold and, moreover, will have little or no survature between the marginal portions. On the other hand, if the sheets are permitted to over sag, too great a curvature will result. In the commercial production of bent glass sheets, it is extremely difficult to provide the precise control over the temperature of the heated atmosphere that is required and thus it is difficult to produce sheets consistenly having the desired curvatures within the required tolerances.

In accordance with the present invention, the foregoing disadvantages are overcome by pressing the heated glass sheets against the shaping surface of the mold, thereby insuring that the glass sheets assume the exact curvature defined by the shaping surface of the mold. To this end, the present invention contemplates the provision of a pressure member 38 disposed adjacent the exist end of the furnace 14 and between the furnace and the blast heads 28, which member may be moved into engagement with the upper surface of the heated bent glass sheet resting on the outline type bending mold 12 to press the sheet between the pressure member and the shaping surface 20 of the mold.

In the present instance, the pressure member 38 is mounted on a suitable framework 39 straddling the path along which the sheets are moved to reciprocate up and down relative to the frame toward and away from the bending mold as the latter is moved thereunder. Herein, the framework 39 includes two vertical posts 40 disposed at each side of the path and spaced apart longitudinally along the path with the posts on opposite sides of the path being transversely aligned. The upper ends of the posts 40 are joined by a generally rectangular frame 41, provided at each corner with openings to receive the upper ends of the posts. The frame 41 is secured in place by nuts 42 threaded onto the upper ends of the posts and bearing against the top of the frame 41.

The pressure member 38 is mounted on the framework 39 through the medium of a generally rectangular mounting member 43 disposed between the frame 41 and the conveyor 27. Each corner of the member 43 has an ear 44 formed integrally therewith and having a cylindrical bore 45 to receive the respective posts. Bushings 46 telescoped on and slidable along the posts are received in the bores 45 and secured by a set screw 47, which bushings guide the vertical sliding of the member.

The pressure member 38 is attached to the mounting member 43 through the medium of bolts 48 projecting through a flange 49 on the pressing member and through plates 50 fixed to the mounting member.

Resilient means acting between the plates 50 and the pressure member 38 are provided to urge the member away from the mounting member while permitting the pressure member to yield upwardly as the latter is moved into engagement with the glass sheet resting on the bending mold thereby to avoid exerting excess pressure against the glass sheets. In the present instance, the resilient means comprise coil springs 51 encircling the bolts 48 and acting between the undersurface of the plates 50 and the upper surface of the flange 49. The yielding movements of the pressure member 38 relative to the mounting member are guided by pins 52 projected upwardly from the pressing member and slidable in bushings 52a secured to the mounting member.

The springs 51 also serve, together with the bolts 48, to permit adjustment of the position of the pressure member relative to the mounting member 43 thereby to properly align the member with the shaping surface of the mold. In this regard, nuts 53 are threaded on upper ends of the bolts to bear against the plates 50 permitting the aforementioned adjustment by threading the nuts along the bolts to compress or relieve the springs.

As will be appreciated, upon leaving the exit end of the furnace, 14 the mold 12 is carried by the conveyor 27 into position beneath the pressure member 38. With the mold in position, the member 43 is slid downwardly along the posts 40 to bring the pressure member 38 into contact with the glass sheet 11 and to force the latter into close engagement with the shaping surface 20 on the mold 12. In this connection, the pressure member is provided with a shaping surface having a curvature which complements the curvature of the shaping surface on the mold.

In the illustrative embodiment, the pressure member includes a continuous shaping face 54 adapted to contact the entire upper surface of the glass sheets. The shaping face has a configuration complementary to the upper surface of the sheet as finally bent. Thus, as viewed in elevation the shaping face curves concavely throughout its entire width along the longitudinal dimension 54a and convexly throughout its entire length along the transverse dimension 54b. In this manner, not only are the marginal edges of the sheet brought into close engagement with the shaping surfaces on the bending mold, but also the portions of the sheet intermediate the shaping surfaces of the mold are bent to the desired anticlastic curvature.

Positioning of the mold beneath the pressure member in proper alignment therewith is attained through the medium of a suitable stop mechanism 55 (FIG. 1) including a finger 56 which, in its operable position, projects into the plane of the path of movement of the mold to abut the leading end of a rack moving along the path and which is retractable to an out-of-the-way position permitting unimpeded movement of the molds along the path, together with an actuator or cylinder 57 for moving the finger between the aforementioned positions. Through suitable control means, to be hereinafter described, the actuator may be activated to move the finger into its operative position to interrupt the movement of the rack along the path and to position the mold beneath the pressure member. After the pressure member has performed its function, that is, after it has been moved downwardly into pressing engagement with the glass sheets and thereafter withdrawn to its uppermost position, the finger is retracted to permit the rack to move along the path and through the blast heads.

Reciprocation of the pressure member 38 toward and away from the path of movement of the molds is effected by a reversible actuator means 58 acting between the mounting member 43 and the frame 41 to slide the latter up and down along the posts 40. In the present instance, the actuator means comprises a piston and cylinder arrangement and preferably, as illustrated in the drawings, two such arrangements are utilized, one located adjacent each end of the mounting member. Each actuator 58 comprises a double acting piston vertically slidable in a cylinder 59 mounted on the frame with the driven member or piston rod 60 secured to the mounting member. Pressure fluid is introduced through suitable conduits 61 selectively into either the head or rod end of the cylinder to slide the piston therealong; the introduction of the fluid being regulated by conventional control means to be hereinafter described.

Figure 5:
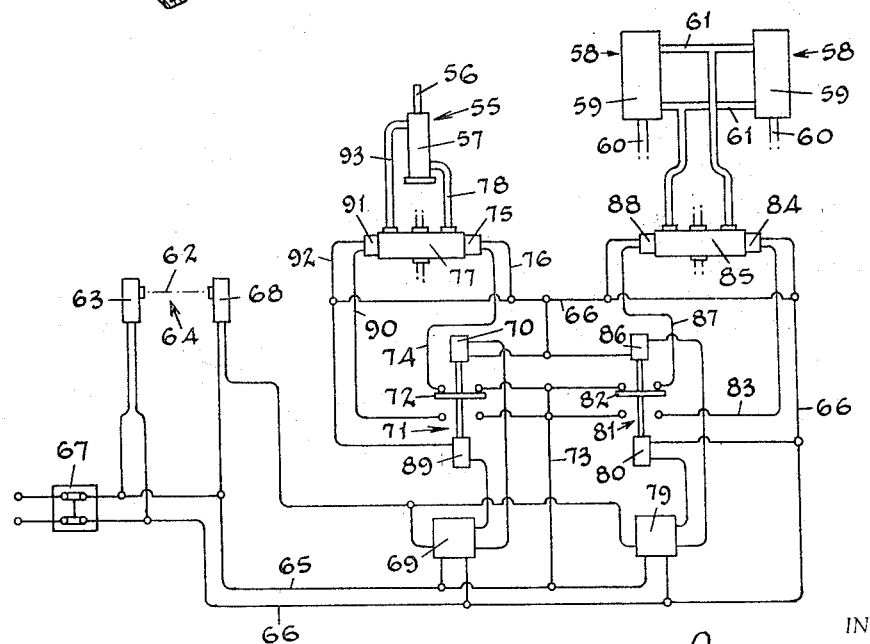
FIG. 5 is a diagram illustrating actuating and control mechanism for the bending apparatus.

There is shown diagrammatically in FIG. 5 a suitable control mechanism for the novel bending apparatus. Thus, upon leaving the furnace, the rack is carried along the conveyor 27 where it interrupts the light beam 62 emanating from the light source 63 of a photoelectric unit 64 suitably connected to power lines 65 and 66 which, in turn, are connected through a switch 67 to a source of electrical power. The light receiving unit 68 of the photoelectric unit transmits a signal to a control center 69 which energizes one end 70 of a double solenoid 71 to close a relay 72. Closing of the relay establishes a circuit from the line 65 through a line 73, relay 72, a line 74, a pressure fluid pump 75, and a line 76 to the line 66. The pump 75 forces fluid from a reservoir 77 through a conduit 78 into the lower end of the cylinder 57, thereby advancing the piston within the cylinder to project the finger 56 attached thereto into the path of the advancing rack. The finger thus engages the leading end of the advancing rack and interrupts its movement to position the mold properly beneath the pressure member 38.

The signal from the light receiving unit 68 is also transmitted to a second control center 79 which, after the mold is stopped in the proper position, energizes one end 80 of a double solenoid 81 to close a relay 82 and establish a circuit from line 65 through line 73, relay 82, a line 83, and a pressure fluid pump 84 to line 66. The pump 84 forces fluid from a reservoir 85 through conduits 61 and into the head end of the cylinders 59 to force the piston rods 60 downwardly, thereby moving the pressure member 38 downwardly into pressing engagement with the glass sheet resting on the shaping surface of the peripheral mold 12. After the pressure member has reached the lower limit of its movement, the control center 79 energizes the other end 86 of the double solenoid 81 to open the circuit through the fluid pump 84, thereby discontinuing pumping of the fluid into the head end of the cylinders 59 and establish a circuit from line 65 through line 73, relay 82, a line 87 and a pressure fluid pump 88 to line 66 as shown in FIG. 5. The pump 88 forces fluid from the reservoir 85 through conduits 61 into the lower end of the cylinders 59 to retract the piston rods 60 and raise the pressure member 38.

As the pressure member is raised, the other end 89 of the double solenoid 71 is energized. This causes the relay 72 to open the circuit through the fluid pump 75 and establish a circuit from the line 65 through the line 73, relay 72, a line 90, a fluid pump 91 and a line 92 to the line 66. The pump 91 forces fluid from the reservoir 77 through a conduit 93 into the head end of the cylinder 57 to retract the finger 56. The rack 13 is then carried forwardly along the path of the conveyor and away from the pressure member, and the apparatus is ready to repeat the cycle as the next mold approaches.

It will be appreciated that glass sheets may be bent to within very close tolerances of rather precisely defined curvatures by the method and apparatus of the present invention. While the sheet is at its greatest temperature, it is contacted only at its marginal edges thereby insuring that the viewing area will not be marred or distorted. After the sheet has assumed a curvature very near the desired curvature, it is contacted by the pressure member which insures that the sheet is brought to the desired curvature. Since the sheet is near the desired curvature at the time it is contacted by the pressure member, very little, if any, relative movement occurs between the pressure member and the glass sheet and thus the tendency for the sheet to become marred is minimal. In addition, it will be appreciated that pressure is only exerted against the non-critical marginal edge portions of the sheet since the intermediate portions of the sheets are free to yield to the forces exerted by the pressure member.

It is to be understood that the form of the invention herewith shown and described is to be taken as an illustrative embodiment only of the same, and that various changes in the shape, size and arrangement of parts, as well as various procedural changes may be resorted to without departing from the spirit of the invention.

We claim:

1. Apparatus for bending glass sheets about both major axes thereof, comprising an outline type bending mold including a substantially continuous peripheral shaping rail having a shaping surface adapted to form an anticlastic curvature in a glass sheet bent into conformity therewith, said shaping rail including a pair of opposed, spaced, longitudinally extending side members and a pair of transversely extending end members connecting the adjacent ends of said side members, the shaping surface portions of said side members being convexly curved as viewed in elevation to create corresponding convex curvature in said sheet in the longitudinal dimension throughout the entire length thereof and the shaping surface portions of said end members being concavely curved as viewed in elevation to create a corresponding concave curvature in the transverse dimension of the sheet throughout the entire length of said sheet, means supporting said mold for movement along a predetermined path, a furnace disposed along said path operable to heat the sheet to the softening point of glass causing it to sag onto said shaping surface, a pressure member disposed above said path, a complemental shaping surface formed on the downwardly directed face of said pressure member, means mounting said pressure member for movement relative to said path, toward and away from said bending mold between a first position wherein said complemental shaping surface is spaced above said mold and a second position wherein said complemental shaping surface is in close proximity to said shaping surface on said mold and operable to force a glass sheet resting on the shaping surface into pressing engagement with said shaping surface and form said anticlastic curvature in said sheet, and actuator means moving said pressure member between said first and second positions in timed relationship to the movement of said mold along said path.

2. Apparatus for bending glass sheets about both major axes thereof, comprising an outline type bending mold including a substantially continuous peripheral shaping rail having a shaping surface adapted to form an anticlastic curvature in a glass sheet bent into conformity therewith, said shaping rail including a pair of opposed, spaced longitudinally extending side members and a pair of transversely extending end members connecting the adjacent ends of said side members, the shaping surface portions of said side members beng convexly curved as viewed in elevation to create corresponding convex curvature in said sheet in the longitudinal dimension throughout the entire length thereof and the shaping surface portions of said end members being concavely curved as viewed in elevation to create a corresponding concave curvature in the transverse dimension of the sheet throughout the entire length of said sheet, said shaping surface being operable to engage the marginal edge portions of said sheet when bent, means supporting said mold for movement along a predetermined path, heating means disposed along said path and operable to heat a glass sheet supported above said shaping surface to an elevated temperature causing said sheet to sag toward said shaping surface, a pressure member disposed above said path, a complemental shaping surface formed on the downwardly directed face of said pressure member, means mounting said pressure member for vertical movement toward and away from said path, and means for moving said pressure member into contact with the upper surface of the sheet in timed relationship to the movement of said mold along said path to force the sheet downwardly into pressing engagement with said shaping surface on said mold and form said anticlastic curvature in said sheet.

3. Apparatus for bending glass sheets about both major axes thereof, comprising an outline type bending mold including a substantially continuous peripheral shaping rail having a shaping surface adapted to form an anticlastic curvature in a glass sheet bent into conformity therewith, said shaping rail including a pair of opposed, spaced, longitudinally extending side members and a pair of transversely extending end members connecting the adjacent ends of said side members, the shaping surface portions of said side members being convexly curved as viewed in elevation to create corresponding convex curvature in said sheet in the longitudinal dimension throughout the entire length thereof and the shaping surface portions of said end members being concavely curved as viewed in elevation to create a corresponding concave curvature in the transverse dimension of the sheet throughout the entire length of said sheet, said shaping surface being operable to engage the marginal portions of said sheet when bent, means for moving said mold along a predetermined path, means for heating a glass sheet supported on said mold above said shaping surfaces to a temperature corresponding to the softening point of glass causing the sheet to sag toward said shaping surface, a pressure member disposed above said path, a complemental shaping surface formed on the downwardly directed face of said pressure member and operable to engage the upper surface of the glass sheet, said complemental shaping surface being curved concavely in the longitudinal dimension as viewed in elevation and convexly in the transverse dimension as viewed in elevation, means mounting said pressure member for vertical movement toward and away from said bending mold, and means for moving said pressure member in timed relationship to the movement of said mold along said path to bring said complemental shaping surface into contact with the upper surface of said sheet thereby to press the marginal portions thereof into close engagement with said shaping surface on said bending mold and to bend the inner portions of said sheet to a predetermined anticlastic curvature.

References Cited by the Examiner

UNITED STATES PATENTS

| | | | |
|---|---|---|---|
| 1,889,881 | 12/1932 | Thompson | 65—305 |
| 2,131,873 | 10/1938 | Goodwillie | 65—273 X |

DONALL H. SYLVESTER, *Primary Examiner.*

A. D. KELLOGG, *Assistant Examiner.*